March 27, 1928.

H. J. MURRAY 1,663,721

CONTROL MEANS

Filed March 7, 1927      4 Sheets-Sheet 1

HOWARD J MURRAY
Inventor
By Smith and Freeman
Attorneys

March 27, 1928.  H. J. MURRAY  1,663,721

CONTROL MEANS

Filed March 7, 1927  4 Sheets-Sheet 2

HOWARD J MURRAY
Inventor
By Smith and Freeman
Attorneys

March 27, 1928.

H. J. MURRAY 1,663,721

CONTROL MEANS

Filed March 7, 1927

HOWARD J MURRAY
Inventor
By Smith and Freeman
Attorneys

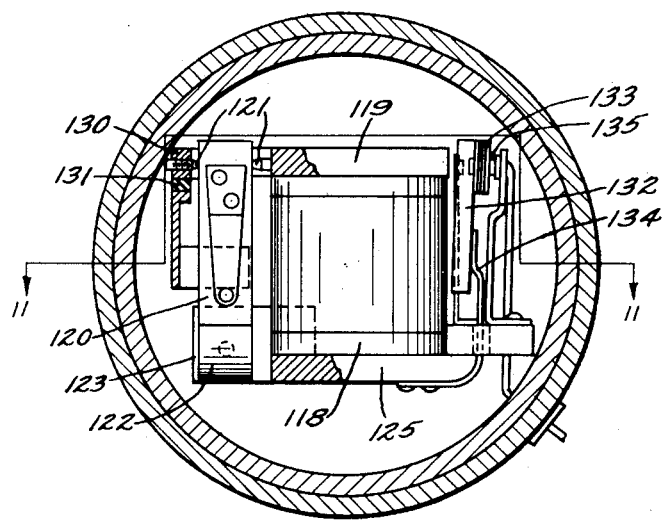
_Fig. 12_
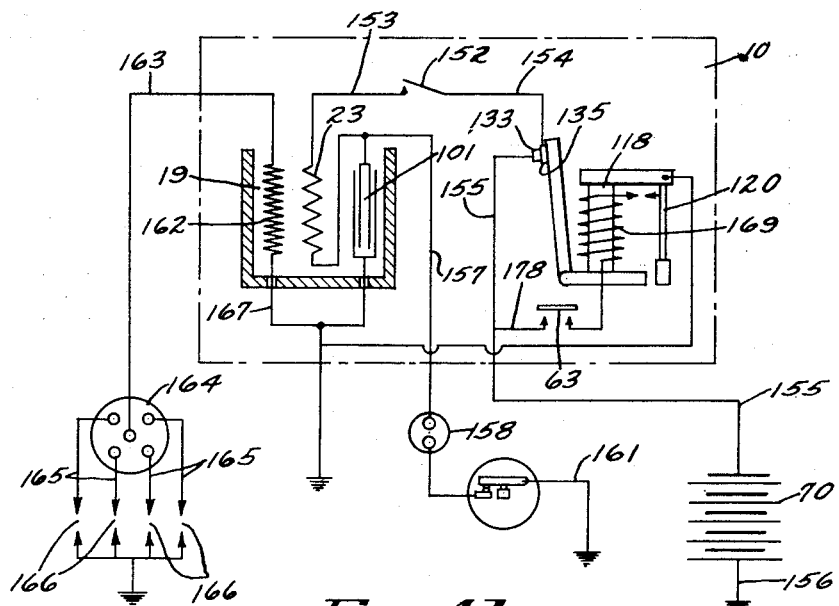
_Fig. 13_

Patented Mar. 27, 1928.

1,663,721

UNITED STATES PATENT OFFICE.

HOWARD J. MURRAY, OF NEW YORK, N. Y., ASSIGNOR TO H. A. DOUGLAS, OF BRONSON, MICHIGAN.

CONTROL MEANS.

Application filed March 7, 1927. Serial No. 173,361.

My invention relates to control means, particularly for the power plant of an automotive vehicle, and in its specific application to the power plant of an automotive vehicle my invention relates to a theft retardance device of the class intended to defeat unauthorized attempts to change the status of some instrument essential to the operation of the power plant.

The present application is a continuation, at least in part, of my copending application Serial Number 494,278, filed August 22, 1921, for automotive theft retardance devices.

The principal object of the present invention is to provide a new and improved control means of the type indicated.

In the drawings accompanying this specification and forming a part of this application I have shown, for purposes of illustration, certain forms which my invention may assume, and in these drawings.

Figure 1:
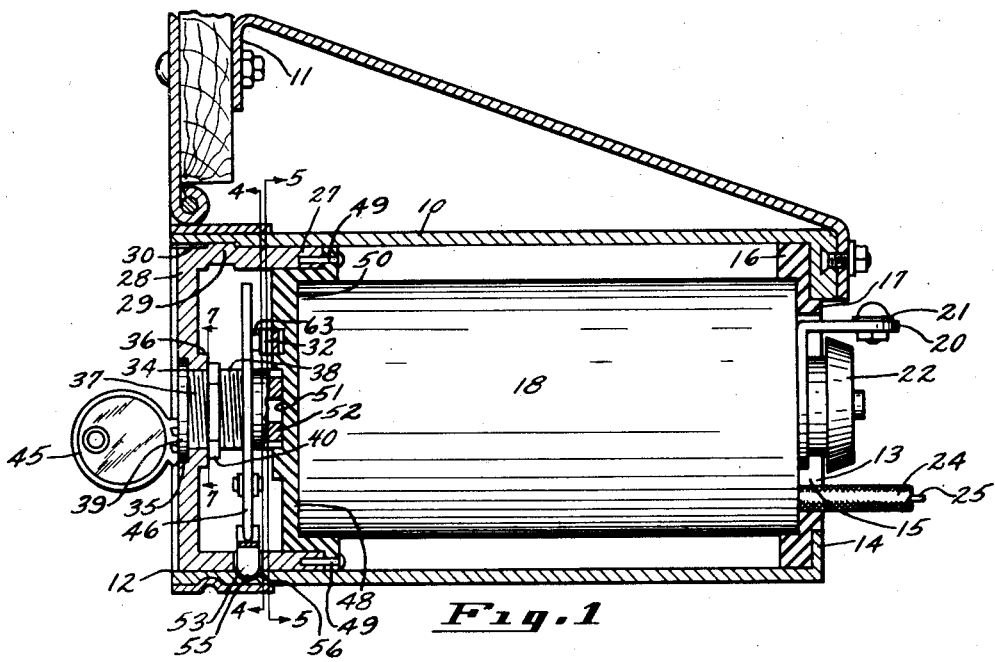
Figure 1 is a vertical longitudinal sectional view through one embodiment of my invention showing the embodiment mounted in position on the instrument board of an automotive vehicle.
Figure 2:
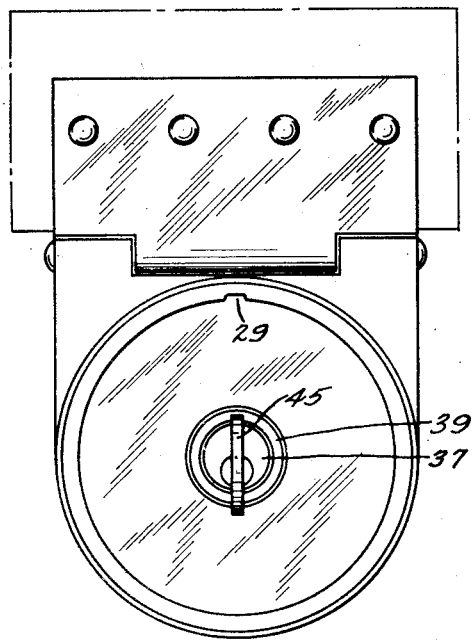
Figure 2 is a front elevation of the device shown in Figure 1.
Figure 3:
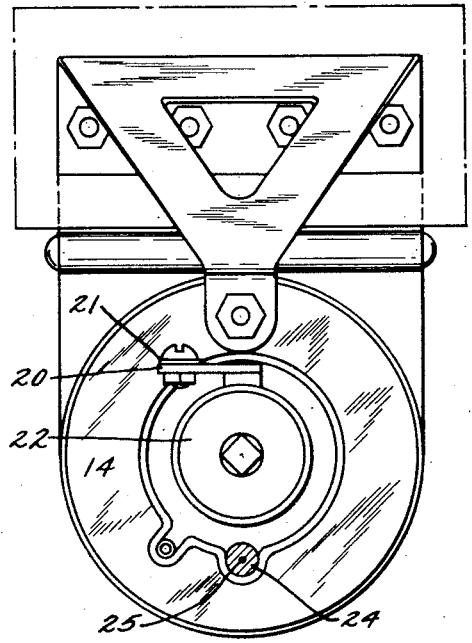
Figure 3 is a rear elevation of the device shown in Figure 1.
Figure 4:
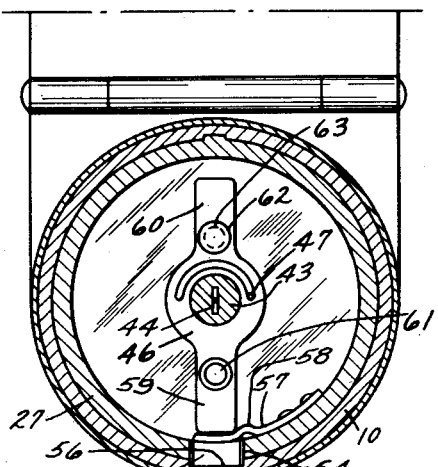
Figure 5:
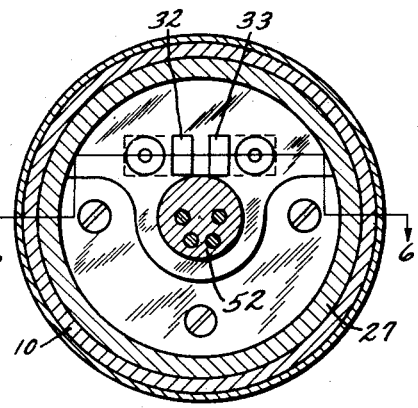
Figure 6:
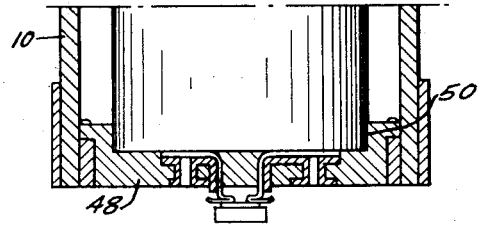
Figure 7:
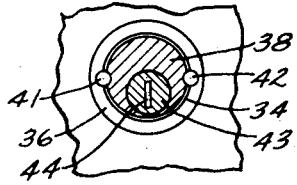
Figure 8:
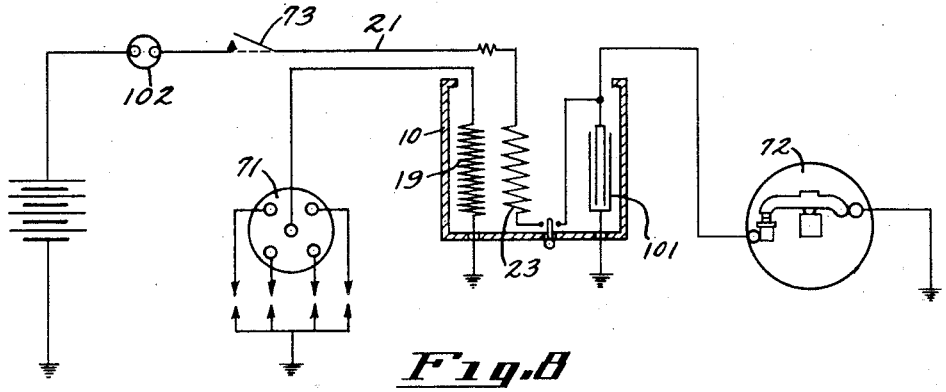
Figure 9:
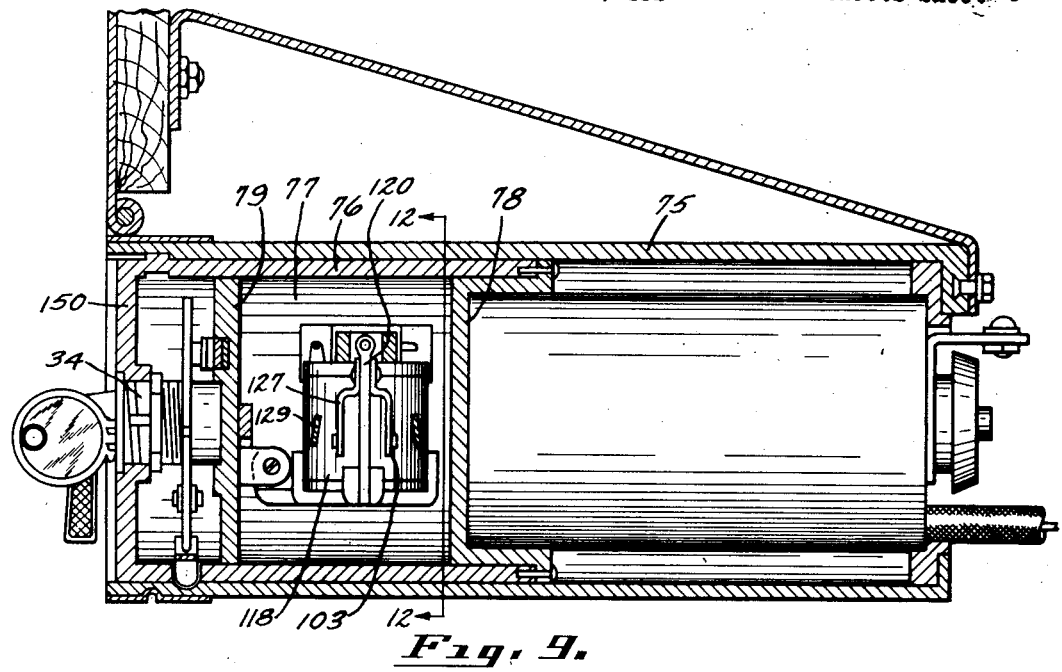
Figure 10:
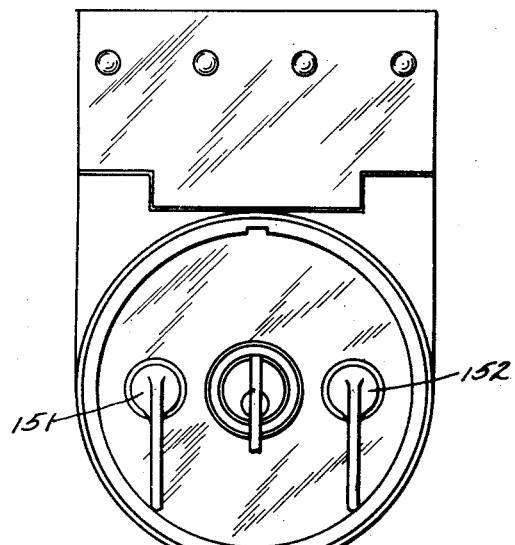
Figure 11:
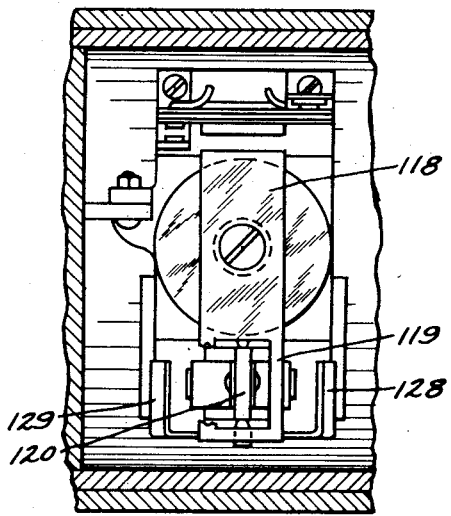

Figures 4 and 5 are each vertical transverse sectional views taken respectively on the lines 4—4 and 5—5 of Figure 1 looking in the directions indicated by the arrows;

Figure 6 is a horizontal sectional view taken on the broken line 6—6 of Figure 5 looking in the direction indicated by the arrows;

Figure 7 is a detail vertical transverse sectional view through the lock taken on the line 7—7 of Figure 1 looking in the direction indicated by the arrows;

Figure 8 is a diagrammatic view of the electrical features of the device shown in Figure 1 illustrating the relation of the device to the other elements of an ignition circuit of conventional form;

Figures 9 and 10 are views similar to Figures 1 and 2 showing a second form which my invention may assume;

Figure 11 is a horizontal section on the line 11—11 of Figure 12 looking in the direction of the arrows;

Figure 12 is a vertical section on the line 12—12 of Figure 9 looking in the direction of the arows; while Figure 13 is a view similar to Figure 8 showing the connection into the system of this second form of my invention.

The embodiment of my invention shown in Figures 1 through 8 comprises a container 10 supported in adjustable position by means of a mounting 11 more particularly described in my Letters Patent of the United States Number 1,552,223, issued September 1, 1925, and entitled Mounting for vehicle instruments.

The container 10 is in the form of a hollow metal cylinder, preferably steel, completely open at its forward end 12, and partially closed at its rear end 13 by means of an inwardly extending flange 14. The flange 14 is provided with an opening 15 which permits access to the interior of the container 10 through its rear end 13. The container 10 is case-hardened on its outer surface and has a relatively soft inner surface. It will be understood that the case-hardened outer portion resists filing, drilling, chiselling, and similar cutting operations, while the soft inner portion resists attempts to shatter the container by the concussion of hammer blows and the like.

A mounting ring 16 is fitted within the container 10 at its rear end 13, engages against the inner side of the flange 14, and is provided with an outwardly extending rim 17 which outlines the opening 15. The ring 16 is countersunk on its underside to provide an inwardly facing peripheral seat 17 for receiving the rear end of a protected instrument 18 herein shown in the form of a cylinder of greater diameter than the diameter of the opening 15 and containing the ignition coil 19 of the ignition system shown diagrammatically in Figure 8.

The rear end of the instrument 18 is exposed to the outside of the container 10 through the opening 15 in the flange 14 so as to permit the attachment of electric conductors and the like to the electric instrument 18. In Figure 1 there is disclosed a binding post 20 to which is connected the conductor 21 constituting the battery lead from the source of electric energy, such as the storage battery 70. The conductor 21 is connected through the exposed resistance 22 to the primary 23 of the ignition coil 19. An insulated cable 24 extends from the coil 19 through the opening 15 and contains a conductor 25 constituting the high tension lead to the ignition distributor 71. A conductor 26 leads from the condenser 101 to the interrupter 72 usually found in ignition systems. While the main parts of the ignition coil 19 are contained in the container 10 it is obvious that most of the parts may be positioned exteriorly of the container 10 provided only that some necessary part be protected; also that access to the interior of the container may be had by destruction of the coil 19.

The opposite or front end of the container 10 is closed by means of a cylindrical cup 27 which when in set position is inset beyond the adjacent free edge of the container 10 so as to prevent the insertion of tools between the closure 27 and the container 10. The closure 27, or at least the outer wall 28 thereof, is case-hardened on the outer surface and soft on the inner surface, as has been described in connection with the container 10. Relative rotary movement between the closure 27 and the container 10 is prevented by a lug 29 on the closure 27 fitting in a slot 30 extending longitudinally inwardly from the outer edge of the container 10 as shown more particularly in Figure 1. This tongue and groove connection assists in limiting the inward movement of the closure 27 and also acts to define the position of parts carried by the closure 27 relative to the mechanical lock 31 and the contacts 32 and 33 hereinafter more fully described.

The wall 28 is provided just below its central axis with an opening 34 which is countersunk at its outer side as shown at 35 and is outlined by a relatively deep flange 36 which extends beyond the inner side of the wall 28 and acts to strengthen the adjacent portion of the closure 27, and the wall 28 carries a lock 37 positioned in the opening 34. The lock 37 is of the conventional barrel type, and includes an outer barrel shell 38 fitted in the opening 34 with a head 39 at the outer end engaging in the countersunk portion 35 and with a lock nut 40 in threaded engagement with the shell 38 and bearing against the rear face of the flange 36 to secure the lock in position. The lock shell 38 is held against rotary movement by means of pins 41 and 42 (see Figure 7) positioned in slots formed half in the shell 38 and half in the flange 36. The lock 37 includes a rotatable barrel 43 journalled in the shell 38 and is provided with a key opening 44 accessible through the front side of the closure 27 and controlled by means of a key 45. As is usual with such constructions, the lock 37 is provided with means (tumblers, etc.) for preventing the withdrawal of the key 45 when the barrel 43 is in any position other than the position in which it is intended to be when in locking position. A cam 46 is secured in the rear end of the barrel 43 and is carried therewith over an angle of 180 degrees by the rotation of the key-controlled barrel 43. The extent of movement of the cam 46 is limited by a pin and slot connection 47 (see Figure 4).

The rear or inner open end of the closure 27 has a filler or mounting plate 48 fitted thereto and secured to the closure by means of screws 49. The mounting ring 16 and the mounting plate 48 may be made of some insulating material such as a fabric reinforced and molded bakelite. The mounting plate 48 is provided with a pocket 50 for receiving the forward end of the instrument 18 which is fixedly secured thereto so that the removal of the closure 27 will carry with it the instrument 18 and permit the removal of the contents of the receptacle 10 as a unit. The front face of the mounting plate 48 is provided adjacent its center with a socketed recess 51 in which is positioned a filler block 52 which may be a rearward extension from the barrel 43 of the lock 37. By this construction the lock 37 and its associated parts are held firmly between the mounting plate 48 and the front wall 28 of the closure 27 thus preventing the forcing of the lock 37 rearwardly by hammering on its front side.

The closure 27 is secured in locked position in the container 10 by means of a spring pressed plunger 53 which extends through an opening 54 formed in the side of the closure 27 and which has a rounded end 55 which engages in a similarly rounded recess 56 formed on the inner face of the container 10. The plunger 53 is held normally in its locking position by means of a spring 57 (see Figure 4) secured at one end to the inner side of the closure 10. The spring 57 is provided with a hump 58 constituting a stop adapted to engage the cam 46 in its movement into the position shown in Figure 4. The cam 46 includes a wing extension 59 which is in the path of movement of the plunger 53 should any attempt be made to move the same into its open or unlocked position. It will be understood that when the extension 59 is removed from the position shown in Figure 4 it is possible to draw the closure 27 from the container 10 by pulling on the key 45. The curved end 55 of the plunger 53 bearing against the curved side of the recess 56 causes the plunger 53 to be raised clear of the recess 56 thus permitting the closure 27 to be drawn forwardly. However, it will also be appreciated that the cam 46 will prevent any such movement of the plunger 53 when the cam 46 is in position to insure the locking of the closure 27 to the container 10. It is a feature of this disclosure that the closure 27 can be locked in position in the container 10 without friction or pressure by simply turning the barrel 43 in the lock 37. For this purpose the extension 59 is so apportioned that when in the path of the plunger 53 the end of the extension 59 will be in close proximity to the adjacent end of the plunger 53 but will not necessarily be in physical contact with the plunger 53.

The cam 46 is provided with another extension 60 projecting radially from the axis of rotation of the barrel 43 in the direction opposite to the direction in which the extension 59 extends. Both extensions are provided with contact carrying apertures spaced equal distances from the axis of the barrel 43 one aperture 61 disposed in the extension 59 and the other aperture 62 in the extension 60. In the disclosure shown in Figure 1 the aperture 62 is provided with a contact button 63 which acts when in the position shown in Figure 4 to close contact with the two relatively fixed contacts 32 and 33 to thus permit the flow of current through the electric instrument 18, through the primary 23. In the form illustrated in Figures 1 through 8 the circuit is completed through the primary 23 of the ignition coil 19 as shown more particularly in Figure 8. This would be the situation where it is desired to open the electric circuit at the same time that the closure 27 is locked in position, but it is within the scope of this disclosure to lock the circuit in closed position at the same time that the closure 27 is secured in locked position, and one such situation would arise where it is intended to enclose in the container 10 either the pendulum actuated circuit closer described in my copending application Serial Number 436,803, multiplex burglar alarm, filed January 12, 1921, or the pendulum actuated circuit closer described in my copending application Serial Number 436,804, filed January 12, 1921, pendulum controlled circuit closer, in which cases a contact similar to the contact button 63 is positioned in the other aperture 61, the arrangement for the enclosure of the pendulum actuated circuit closer of application 436,803 being more particularly shown in Figures 9 through 13.

In the disclosure in Figure 8 the present form of ignition switch 73 is shown diagrammatically in the ignition circuit, but it will be understood that this present switch 73 may be entirely omitted, or in order to retain present wiring the battery lead 21 may be connected directly to the lead from the ammeter 102 connected to the battery side of the switch 73, as shown by dotted lines in the drawing.

The embodiment of my invention shown in Figures 1 through 8 is operated as the present ignition switch is worked, the operator inserting the key 45 and turning the same to close the circuit through the housed ignition coil 19. On leaving the vehicle he turns the key 45 into position to cut off the current through the ignition coil 19 and at the same time locks the container 10 against surreptitious opening by unauthorized persons. Should the party possessing the key desire to withdraw the contents of the container 10, or otherwise obtain access to the enclosed parts, he partially turns the key 45 so as to remove the cam 46 from its position stopping the movement of the plunger 53, and then, by pulling on the key 45, slips the closure 27 and contained instrument 18 forwardly through the open end 12 of the container 10. Usually the different conductors at the rear of the device have sufficient slack to permit this movement of the instrument 18.

By means of a device of the class described it is possible to enclose the ignition coil 19, or other necessary part of the ignition circuit, so that resistance and other parts may be exposed if desired, but with the controlling switch or circuit closer inaccessible. It is possible by opening the primary circuit of the ignition coil when so enclosed to secure the coil in this position with the circuit through the coil maintained open. It is thus possible to lock the electric circuit and the container with one key, and with one movement of that key.

This arrangement, however, prevents the operator leaving the engine running while the vehicle is protected, but that may be provided for, as heretofore suggested, by incorporating in the container the pendulum actuated circuit closer of my copending application 436,803, the arrangement for doing this being more particularly shown, as heretofore stated, in Figures 9 through 13 of the drawings, and this arrangement constituting a second embodiment which my invention may assume.

In this second embodiment of my invention I provide a container 75 and a closure 76 similar respectively to the container 10 and the closure 27, but elongated to provide a compartment 77 for the reception of the pendulum actuated circuit closer 103, and I provide in lieu of the partition 48 two partitions 78 and 79 performing the functions respectively of the rear and front halves of the partition 48, but separated by the interposition of the pendulum actuated circuit closer chamber 77.

In this chamber 77 I then mount the pendulum actuated circuit closer 103 shown in my application 436,803, this circuit closer comprising an electromagnet 118 having an upper pole piece 119 which extends beyond the spool part of the electromagnet 118 and provides a support for a pendulum 120, the upper end of which is pivotally fulcrumed between pivot pins 121, and the lower end of which is provided with a bob 122 constituting a movable armature oscillating between the spaced apart ends 123 and 124 of the lower fixed pole piece 125 of the electromagnet 118.

The pendulum 120 constitutes the movable element of a two point contact circuit closer and carries on opposite sides spring arms 126 and 127 for engagement respectively with relatively fixed contacts 128 and 129 constituting part of a plate 130 depending from the extended portion of the upper pole piece 119 and insulated therefrom by means of a strip of insulating material 131. In order to defeat any tendency of the pole ends 123 and 124 to neutralize their pull on the pendulum bob 122 the pendulum 120 is hung nearer one pole end than the other, or the impedance of one of the pole ends is increased over the other.

On the side of the electromagnet 118 opposite the pendulum 120 there is pivotally mounted a rocking armature 132 normally disposed in spaced relation to the adjacent end of the upper pole piece 119 and held in circuit closing engagement with a relatively fixed contact 133 by means of a spring 134. A coacting contact 135 is carried by the armature 132 and connects with the fixed contact 133 to normally close the ignition circuit therethrough, but when actuated by the electromagnet 118 the armature 132 is drawn toward the upper pole 119 to break the ignition circuit by separating the contacts 133 and 135.

Mounted on the front plate 150 of the closure 76 on the two sides of the lock 34 are a pair of circuit closers 151 and 152, the circuit closer 152 corresponding to the circuit closer 14 of my application 438,803, controlling certain lights, and not particularly of interest here, and the circuit closer 151 corresponding to the circuit closer 12 of my application 436,803, and being the ignition switch normally controlling the ignition circuit.

Referring particularly to Figure 13 it will be seen that the primary 23 of the ignition coil 19 is connected by means of a conductor 153 to the normal ignition switch 152, thence by means of a conductor 154 to the contact 135 on the armature 132, that the cooperating contact 133 is connected by means of a conductor 155 to the storage battery 70 connected to ground by means of the conductor 156, that the other side of the primary 23 of the ignition coil 19 is connected by means of a conductor 157 to an ammeter 158, and thence by means of a conductor 159 to an interrupter 160 connected to ground by means of a conductor 161, that the secondary 162 of the ignition coil 19 is connected by means of the conductors 163 to the distributor 164 connected by means of conductors 165 to spark plugs 166 grounded in the usual manner, that the other side of the secondary 162 is connected to ground by means of a conductor 167, that a branch 178 from the conductor 155 is connected through the lock-switch contact 63 to the winding 169 of the electromagnet 118, that the other side of the winding 169 is connected through the circuit closer controlled by the pendulum 120 to the conductor 167 grounding one side of the condenser 101 the other side of which is connected to the second side of the primary winding 23, the parts within the container 10 being enclosed within the broken line.

From the above disclosure it will be obvious to those skilled in the art that in the embodiment of my invention shown in Figures 9 through 13 the ignition circuit is normally controlled by the normal ignition switch 152, but that the ignition circuit also passes through the contacts 135 and 133 controlled by the armature 132 of the electromagnet switch 118 so that the circuit through the ignition coil may be interrupted not only by opening the normal ignition switch 152 but also by attraction of the armature 132 by the electromagnetic switch 118 occurring whenever the lock-controlled contact 63 is in circuit closing position and the pendulum 120 is actuated to close the circuit between itself and either of the contacts 128 and 129.

Under these circumstances it will be obvious to those skilled in the art that so long as the lock-controlled contact 63 is in open position the electromagnetic switch 118 is inoperative, the armature 132 is retracted, the contacts 133 and 135 are in engagement, and the ignition circuit is controlled solely by the normal ignition switch 152; that upon movement of the contact 63 into the circuit closing position the electromagnetic switch 118 will remain inoperative because of the gap at the circuit closer controlled by the pendulum 120 so that the ignition circuit may still remain closed, and the engine may be left running; but that in this case as soon as the pendulum 120 is actuated by a disturbance of the rest condition of the automobile, or in any of the other manners disclosed or suggested in my application 436,803, or the circuit through the winding 169 closed in any other manner, as in any of the manners disclosed or suggested in my application 436,803, then a circuit will be completed through the winding 169 of the electromagnetic switch 118 to attract the pendulum 120 to close the circuit closer controlled thereby to maintain the circuit closed through the winding 169, and the electromagnetic switch 118 energized, and to simultaneously attract the armature 132, and hold the armature 132 attracted, to separate the contacts 133 and 135 to open the ignition circuit, and to hold the contacts 133 and 135 separated to hold that circuit open until the contact 63 is moved out of circuit closing position.

It will of course be understood that in this embodiment of my invention the contact 63 is carried in the aperture 61 to be in circuit closing position when the lock 34 is in locked position, and can be moved out of this position only by insertion of the key 45, and rotation of the lock barrel 43 by the key 45, so that the movement of the lock barrel 43 into position permitting withdrawal of the key 45 moves the contact 63 into circuit closing position setting the electromagnetic switch 118 to subject the continuance of the operation of the engine, under control of the normal ignition switch 152, to the absence of any predetermined condition, particularly the disturbance of the vehicle from its rest position, upon the occurrence of which the electromagnetic switch 118 will operate to open the ignition circuit, and to hold the ignition circuit open until the key 45 is again inserted in the lock 34 and the lock barrel 43 rotated to move the contact 63 out of circuit closing position.

It will therefore be understood that the operator of the automobile in preparing to operate the automobile will insert the key 45 and rotate the lock barrel 43 to move the contact 63 out of circuit closing position and disable the electromagnetic switch 118, after which the vehicle engine can be operated in the usual manner subject only to control of the normal ignition switch 152; that in leaving the vehicle the operator will turn the lock barrel 43 into position permitting removal of the key 45, and will remove the key 45, leaving the parts locked in position blocking withdrawal of the closure 76 and with the contact 63 in circuit closing position rendering the electromagnetic switch 118 operative to open the ignition circuit upon the occurrence of any predetermined condition, particularly disturbance of the rest position of the vehicle, and to then maintain the ignition circuit open until the key 45 is inserted, and the contact 63 moved out of circuit closing position, thereby effectively preventing unauthorized operation of the vehicle; and that with the parts in this position the operator may shut off the engine immediately by opening the normal ignition switch 152, or may leave the normal ignition switch 152 in closed position to leave the engine running at least until such time as interference with the vehicle causes operation of the electromagnetic switch 118.

It will therefore be understood by those skilled in the art that the embodiment of my invention disclosed in Figures 9 through 13 provides a lock absolutely preventing unauthorized operation of the vehicle, yet permitting the vehicle to be locked with the engine operating, a condition highly desirable under certain circumstances, particularly in cold weather with the vehicle being used for short runs between long stops.

At the same time it will also be obvious to those skilled in the art that both the embodiments of my invention herein shown and described may be variously changed and modified without departing from the spirit of my invention or sacrificing the advantages thereof, and accordingly it will be understood that the disclosure herein is illustrative only, and that my invention is not limited thereto.

I claim:

1. In a power plant for an automotive vehicle, a unit comprising: an element essential for the operation of said power plant; control means settable into condition at least restricting the functioning of said element; lock means for preventing unauthorized actuation of said control means from said condition; and means for preventing unauthorized access to said control means without disassembly of said unit, and for preventing unauthorized disassembly of said unit without destruction of at least an essential part of said element, comprising a theft-resisting casing enclosing said control means and at least the adjacent portion of said element.

2. In an ignition system of an internal combustion engine of an automotive vehicle, a unit comprising: an element essential in said system for the operation of said engine; control means settable into condition at least restricting the functioning of said element; lock means for preventing unauthorized actuation of said control means from said condition; and means for preventing unauthorized access to said control means without disassembly of said unit, and for preventing unauthorized disassembly of said unit without destruction of at least an essential part of said element comprising a theft-resisting casing enclosing said control means and at least the adjacent portion of said element.

3. In an ignition system of an internal combustion engine of an automotive vehicle, a unit comprising: the ignition coil of said system; control means settable into condition at least restricting the functioning of said coil; lock means for preventing unauthorized actuation of said control means from said condition; and means for preventing unauthorized access to said cntrol means without disassembly of said unit, and for preventing unauthorized disassembly of said unit without destruction of at least an essential part of said coil, comprising a theft-resisting casing enclosing said control means and at least the adjacent portion of said coil.

4. In an ignition system of an internal combustion engine of an automotive vehicle, a unit comprising: an element essential in said system for the operation of said engine; switch means connected in controlling relation with said element and settable into condition at least restricting the functioning of said element; lock means for preventing unauthorized actuation of said switch means from said condition; and means for preventing unauthorized access to said switch means without disassembly of said unit, and for preventing unauthorized disassembly of said unit without destruction of at least an essential part of said element, comprising a theft-resisting casing enclosing said switch means and at least the adjacent portion of said element.

5. In an ignition system of an internal combustion engine of an automotive vehicle, a unit comprising: the ignition coil of said system; switch means connected in controlling relation with said coil and settable into condition at least restricting the functioning of said coil; lock means for preventing unauthorized actuation of said switch means from said condition; and means for preventing unauthorized access to said switch means without disassembly of said unit, and for preventing unauthorized disassembly of said unit without destruction of at least an essential part of said coil, comprising a theft-resisting casing enclosing said switch means and at least the adjacent portion of said coil.

6. In a power plant for an automotive vehicle, a unit comprising: an element essential for the operation of said power plant; control means settable into condition at least restricting the functioning of said element; lock-controlled operating means for said control means for preventing unauthorized actuation of said control means from said condition; and means for preventing unauthorized access to said control means without disassembly of said unit, and for preventing unauthorized disassembly of said unit without destruction of at least an essential part of said element, comprising a theft-resisting casing enclosing said control means and at least the adjacent portion of said element.

7. In an ignition system of an internal combustion engine of an automotive vehicle, a unit comprising: an element essential in said system for the operation of said engine; switch means connected in controlling relation with said element and settable into condition at least restricting the functioning of said element; lock-controlled operating means for said switch means for preventing unauthorized actuation of said switch means from said condition; and means for preventing unauthorized access to said switch means without disassembly of said unit and for preventing unauthorized disassembly of said unit without destruction of at least an essential part of said element, comprising a theft-resisting casing enclosing said switch means and at least the adjacent portion of said element.

8. In a power plant for an automotive vehicle, a unit comprising: an element essential for the operation of said power plant; control means settable into condition at least restricting the functioning of said element; lock means for preventing unauthorized actuation of said control means from said condition; and means for preventing unauthorized access to said control means without disassembly of said unit, and for preventing unauthorized disassembly of said unit without destruction of at least an essential part of said element, comprising a theft-resisting casing carrying said lock means and enclosing said control means and at least the adjacent portion of said element.

9. In a power plant for an automotive vehicle, a unit comprising: an element essential for the operation of said power plant; control means settable into condition at least restricting the functioning of said element; lock-controlled operating means for said control means for preventing unauthorized actuation of said control means from said condition; and means for preventing unauthorized access to said control means without disassembly of said unit, and for preventing unauthorized disassembly of said unit without destruction of at least an essential part of said element, comprising a theft-resisting casing carrying said lock-controlled operating means and enclosing said control means and at least the adjacent portion of said element.

10. In an ignition system of an internal combustion engine of an automotive vehicle, a unit comprising: an element essential in said system for the operation of said engine; switch means connected in controlling relation with said element and settable into condition at least restricting the functioning of said element; lock-controlled operating means for said switch means for preventing unauthorized actuation of said switch means from said condition; and means for preventing unauthorized access to said switch means without disassembly of said unit, and for preventing unauthorized disassembly of said unit without destruction of at least an essential part of said element, comprising a theft-resisting casing carrying said lock-controlled operating means and enclosing said switch means and at least the adjacent portion of said element.

11. In a power plant for an automotive vehicle, a unit comprising: an element essential for the operation of said power plant; control means settable into condition at least restricting the functioning of said element; lock means for preventing unauthorized actuation of said control means from said condition; and means for permitting authorized access to said control means but for preventing unauthorized access to said control means without disassembly of said unit without destruction of at least on essential part of said element, comprising a theft-resisting casing enclosing said control means and at least the adjacent portion of said element.

12. In a power plant for an automotive vehicle, a unit comprising: an element essential for the operation of said power plant; control means settable into condition at least restricting the functioning of said element; lock means for preventing unauthorized actuation of said control means from said condition; and means for preventing unauthorized access to said control means without disassembly of said unit, and for permitting authorized disassembly of said unit, and for preventing unauthorized disassembly of said unit but for preventing unauthorized disassembly of said unit without destruction of at least an essential part of said element, comprising a theft-resisting casing enclosing said control means and at least the adjacent portion of said element.

13. In a power plant for an automotive vehicle, a unit comprising: an element essential for the operation of said power plant; control means settable into condition at least restricting the functioning of said element; lock means for preventing unauthorized actuation of said control means from said condition; and a theft-resisting casing enclosing said control means and at least the adjacent portion of said element and for preventing unauthorized access to said control means without disassembly of said unit, and unauthorized disassembly of said unit without destruction of at least an essential part of said element.

14. In an ignition system of an internal combustion engine of an automotive vehicle, a unit comprising: the ignition coil of said system; control means settable into condition at least restricting the functioning of said coil; lock means for preventing unauthorized actuation of said control means from said condition; and a theft-resisting casing enclosing said control means and at least the adjacent portion of said coil and for preventing unauthorized access to said control means without disassembly of said unit, and unauthorized disassembly of said unit without destruction of at least an essential part of said coil.

15. In a power plant for an automotive vehicle, a unit comprising: an element essential for the operation of said power plant; control means settable into condition for preventing functioning of said element; lock means for preventing unauthorized actuation of said control means from said condition; and means for preventing unauthorized access to said control means without disassembly of said unit, and for preventing unauthorized disassembly of said unit without destruction of at least an essential part of said element, comprising a theft-resisting casing enclosing said control means and at least the adjacent portion of said element.

16. In an ignition system of an internal combustion engine of an automotive vehicle, a unit comprising: an element essential in said system for the operation of said engine; switch means connected in controlling relation with said element and settable into condition for preventing functioning of said element; lock means for preventing unauthorized actuation of said switch means from said condition; and means for preventing unauthorized access to said switch means without disassembly of said unit, and for preventing unauthorized disassembly of said unit without destruction of at least an essential part of said element, comprising a theft-resisting casing enclosing said switch means and at least the adjacent portion of said element.

17. In a power plant for an automotive vehicle, a unit comprising: a theft-resisting casing provided with an element compartment, and with a control compartment closed against unauthorized access except through said element compartment; an element essential for the operation of said power plant, disposed at least partly within said element compartment; control means within said control compartment settable into condition at least restricting the functioning of said element; lock means for preventing unauthorized actuation of said control means from said condition; and means cooperating with said casing and said element to secure said element in position cooperating with said casing and said means to block access to said control compartment through said element compartment and held against unauthorized removal from such position without destruction of at least an essential portion of said element.

18. In an ignition system for an internal combustion engine of an automative vehicle, a unit comprising: a theft-resisting casing provided with an element compartment, and with a control compartment closed against unauthorized access except through said element compartment; an element essential in said system for the operation of said engine disposed at least partly within said element compartment; control means within said control compartment settable into condition at least restricting the functioning of said element; lock means for preventing unauthorized actuation of said control means from said condition; and means cooperating with said casing and said element to secure said element in position cooperating with said casing and said means to block access to said control compartment through said element compartment and held against unauthorized removal from such position without destruction of at least an essential portion of said element.

19. In an ignition system of an internal combustion engine of an automotive vehicle, a unit comprising: a theft-resisting casing provided with a coil compartment, and with a control compartment closed against unauthorized access except through said coil compartment; the ignition coil of said system, disposed at least partly within said coil compartment; control means within said control compartment settable into condition at least restricting the functioning of said coil; lock means for preventing unauthorized actuation of said control means from said condition; and means cooperating with said casing and said coil to secure said coil in position cooperating with said casing and said means to block access to said control compartment through said coil compartment and held against unauthorized removal from such position without destruction of at least an essential portion of said coil.

20. In an ignition system of an internal combustion engine of an automotive vehicle, a unit comprising: a theft-resisting casing provided with an element compartment, and with a control compartment closed against unauthorized access except through said element compartment; an element essential in said system for the operation of said engine, disposed at least partly within said element compartment; switch means within said control compartment connected in controlling relation with said element and settable into condition at least restricting the functioning of said element; lock means for preventing unauthorized actuation of said switch means from said condition; and means cooperating with said casing and said element to secure said element in position cooperating with said casing and said means to block access to said control compartment through said element compartment and held against unauthorized removal from such position without destruction of at least an essential portion of said element.

21. In an ignition system of an internal combustion engine of an automotive vehicle, a unit comprising: a theft-resisting casing provided with a coil compartment, and with a control compartment closed against unauthorized access except through said coil compartment; the ignition coil of said system, disposed at least partly within said coil compartment; switch means within said control compartment connected in controlling relation with said coil and settable into condition at least restricting the functioning of said coil; lock means for preventing unauthorized actuation of said switch means from said condition; and means cooperating with said casing and said coil to secure said coil in position cooperating with said casing and said means to block access to said control compartment through said coil compartment and held against unauthorized removal from such position without destruction of at least an essential portion of said coil.

22. In a power plant for an automotive vehicle, a unit comprising: a theft-resisting casing provided with an element compartment, and with a control compartment closed against unauthorized access except through said element compartment; an element essential for the operation of said power plant, disposed at least partly within said element compartment; control means within said control compartment settable into condition at least restricting the functioning of said element; lock-controlled operating means for said control means for preventing unauthorized actuation of said control means from said condition; and means cooperating with said casing and said element to secure said element in position cooperating with said casing and said means to block access to said control compartment through said element compartment and held against unauthorized removal from such position without destruction of at least an essential portion of said element.

23. In an ignition system of an internal combustion engine of an automotive vehicle, a unit comprising: a theft-resisting casing provided with an element compartment, and with a control compartment closed against unauthorized access except through said element compartment; an element essential in said system for the operation of said engine, disposed at least partly within said element compartment; switch means within said control compartment connected in controlling relation with said element and settable into condition at least restricting the functioning of said element; lock-controlled operating means for said switch means for preventing unauthorized actuation of said switch means from said condition; and means cooperating with said casing and said element to secure said element in position cooperating with said casing and said means to block access to said control compartment through said element compartment and held against unauthorized removal from such position without destruction of at least an essential portion of said element.

24. In a power plant for an automotive vehicle, a unit comprising: a theft-resisting casing provided with an element compartment, and with a control compartment closed against unauthorized access except through said element compartment; an element essential for the operation of said power plant, disposed at least partly within said element compartment; control means within said control compartment settable into condition at least restricting the functioning of said element; lock means carried by said casing and for preventing unauthorized actuation of said control means from said condition; and means cooperating with said casing and said element to secure said element in position cooperating with said casing and said means to block access to said control compartment through said element compartment and held against unauthorized removal from such position without destruction of at least an essential portion of said element.

25. In a power plant for an automotive vehicle, a unit comprising: a theft-resisting casing provided with an element compartment, and with a control compartment closed against unauthorized access except through said element compartment; an element essential for the operation of said power plant, disposed at least partly within said element compartment; control means within said control compartment settable into condition at least restricting the functioning of said element; lock-controlled operating means for said control means carried by said casing and for preventing unauthorized actuation of said control means from said condition; and means cooperating with said casing and said element to secure said element in position cooperating with said casing and said means to block access to said control compartment through said element compartment and held against unauthorized removal from such position without destruction of at least an essential portion of said element.

26. In an ignition system of an internal combustion engine of an automotive vehicle, a unit comprising: a theft-resisting casing provided with an element compartment, and with a control compartment closed against unauthorized access except through said element compartment; an element essential in said system for the operation of said engine, disposed at least partly within said element compartment; switch means within said control compartment connected in controlling relation with said element and settable into condition at least restricting the functioning of said element; lock-controlled operating means for said switch means carried by said casing and for preventing unauthorized actuation of said switch means from said condition; and means cooperating with said casing and said element to secure said element in position cooperating with said casing and said means to block access to said control compartment through said element compartment and held against unauthorized removal from such position without destruction of at least an essential portion of said element.

27. In a power plant for an automotive vehicle, a unit comprising: a theft-resisting casing provided with an element compartment, and with a control compartment closed against unauthorized access except through said element compartment; an element essential for the operation of said power plant, disposed at least partly within said element compartment; control means within said control compartment settable into condition at least restricting the functioning of said element; and lock means for preventing unauthorized actuation of said control means from said condition; said casing securing said element in position cooperating with said casing to block access to said control compartment through said element compartment and held against unauthorized removal from such position without destruction of at least an essential portion of said element.

28. In an ignition system of an internal combustion engine of an automotive vehicle, a unit comprising: a theft-resisting casing provided with a coil compartment, and with a control compartment closed against unauthorized access except through said coil compartment; the ignition coil of said system, disposed at least partly within said coil compartment; control means within said control compartment settable into condition at least restricting the functioning of said coil; and lock means for preventing unauthorized actuation of said control means from said condition; said casing securing said coil in position cooperating with said casing to block access to said control compartment through said coil compartment and held against unauthorized removal from such position without destruction of at least an essential portion of said coil.

29. In a power plant for an automotive vehicle, a unit comprising: a theft-resisting casing provided with an element compartment, and with a control compartment open to authorized access but closed against unauthorized access except through said element compartment; an element essential for the operation of said power plant, disposed at least partly within said element compartment; control means within said control compartment settable into condition at least restricting the functioning of said element; lock means for preventing unauthorized actuation of said control means from said condition; and means coooperating with said casing and said element to secure said element in position cooperating with said casing and said means to block access to said control compartment through said element compartment and held against unauthorized removal from such position without destruction of at least an essential portion of said element.

30. In a power plant for an automotive vehicle, a unit comprising: a theft-resisting casing provided with an element compartment, and with a control compartment closed against unauthorized access except through said element compartment; an element essential for the operation of said power plant, disposed at least partly within said element compartment; control means within said control compartment settable into condition at least restricting the functioning of said element; lock means for preventing unauthorized actuation of said control means from said condition; and means cooperating with said casing and said element to secure said element in position cooperating with said casing and said means to block access to said control compartment through said element compartment and held removable by authorized removal but secured against unauthorized removal from such position without destruction of at least an essential portion of said element.

31. In a power plant for an automotive vehicle, a unit comprising: an element essential for the operation of said power plant; control means settable in position restricting the functioning of said element to permit functioning of said element only under predetermined conditions; and means for preventing unauthorized removal of such restriction without destruction of at least an essential portion of said element.

32. In a power plant for an automotive vehicle, a unit comprising: an element essential for the operation of said power plant; control means settable in position restricting the functioning of said element to permit functioning of said element only while said vehicle is substantially at rest; and means for preventing unauthorized removal of such restriction without destruction of at least an essential portion of said element.

33. In an ignition system of an internal combustion engine of an automotive vehicle, a unit comprising: an element essential in said system for the operation of said engine; switch means connected in controlling relation with said element and settable in position restricting the functioning of said element to permit functioning of said element only under predetermined conditions; and means for preventing unauthorized removal of such restriction without destruction of at least an essential portion of said element.

34. In an ignition system of an internal combustion engine of an automotive vehicle, a unit comprising: an element essential in said system for the operation of said engine; switch means connected in controlling relation with said element and settable in position restricting the functioning of said element to permit functioning of said element only while said vehicle is substantially at rest; and means for preventing unauthorized removal of such restriction without destruction of at least an essential portion of said element.

35. In a power plant for an automotive vehicle, a unit comprising: an element essential for the operation of said power plant; control means settable into condition restricting the functioning of said element to permit functioning of said element only under predetermined conditions; lock means for preventing unauthorized actuation of said control means from said condition; and means for preventing unauthorized access to said control means without disassembly of said unit, and for preventing unauthorized disassembly of said unit without destruction of at least an essential portion of said element.

36. In a power plant for an automotive vehicle, a unit comprising: an element essential for the operation of said power plant; control means settable into condition restricting the functioning of said element to permit functioning of said element only while said vehicle is substantially at rest; lock means for preventing unauthorized actuation of said control means from said condition; and means for preventing unauthorized access to said control means without disassembly of said unit, and for preventing unauthorized disassembly of said unit without destruction of at least an essential portion of said element.

37. In an ignition system for an internal combustion engine of an automotive vehicle, a unit comprising: an element essential in said system for the operation of said engine; switch means connected in controlling relation with said element and settable into condition restricting the functioning of said element to permit functioning of said element only under predetermined conditions; lock means for preventing unauthorized actuation of said switch means from said condition; and means for preventing unauthorized access to said switch means without disassembly of said unit, and for preventing unauthorized disassembly of said unit without destruction of at least an essential portion of said element.

38. In an ignition system for an internal combustion engine of an automotive vehicle, a unit comprising: an element essential in said system for the operation of said engine; switch means connected in controlling relation with said element and settable into condition restricting the functioning of said element to permit functioning of said element only while said vehicle is substantially at rest; lock means for preventing unauthorized actuation of said switch means from said condition; and means for preventing unauthorized access to said switch means without disassembly of said unit, and for preventing unauthorized disassembly of said unit without destruction of at least an essential portion of said element.

39. In a power plant for an automotive vehicle, a unit comprising: an element essential for the operation of said power plant; control means settable into condition restricting the functioning of said element to permit functioning of said element only under predetermined conditions; lock means for preventing unauthorized actuation of said control means from said condition; and means for preventing unauthorized access to said control means without disassembly of said unit, and for preventing unauthorized disassembly of said unit without destruction of at least an essential part of said element, comprising a theft-resisting casing enclosing said control means and at least the adjacent portion of said element.

40. In a power plant for an automotive vehicle, a unit comprising: an element essential for the operation of said power plant; control means settable into condition restricting the functioning of said element to permit functioning of said element only when said vehicle is substantially at rest; lock means for preventing unauthorized actuation of said control means from said condition; and means for preventing unauthorized access to said control means without disassembly of said unit, and for preventing unauthorized disassembly of said unit without destruction of at least an essential part of said element, comprising a theft-resisting casing enclosing said control means and at least the adjacent portion of said element.

41. In an ignition system of an internal combustion engine of an automotive vehicle, a unit comprising: an element essential in said system for the operation of said engine; switch means connected in controlling relation with said element and settable into condition restricting the functioning of said element to permit functioning of said element only under predetermined conditions; lock means for preventing unauthorized actuation of said switch means from said condition; and means for preventing unauthorized access to said switch means without disassembly of said unit, and for preventing unauthorized disassembly of said unit without destruction of at least an essential part of said element, comprising a theft-resisting casing enclosing said switch means and at least the adjacent portion of said element.

42. In an ignition system of an internal combustion engine of an automotive vehicle, a unit comprising: an element essential in said system for the operation of said engine; switch means connected in controlling relation with said element and settable into condition restricting the functioning of said element to permit functioning of said element only when said vehicle is substantially at rest; lock means for preventing unauthorized actuation of said switch means from said condition; and means for preventing unauthorized access to said switch means without disassembly of said unit, and for preventing unauthorized disassembly of said unit without destruction of at least an essential part of said element, comprising a theft-resisting casing enclosing said switch means and at least the adjacent portion of said element.

43. In a power plant for an automotive vehicle, a unit comprising: an element essential for the operation of said power plant; control means settable in position restricting the functioning of said element to permit functioning of said element only under predetermined conditions; and means for preventing unauthorized removal of such restriction.

44. In a power plant for an automotive vehicle, a unit comprising: an element essential for the operation of said power plant; control means settable in position restricting the functioning of said element to permit functioning of said element only while said vehicle is substantially at rest; and means for preventing unauthorized removal of such restriction.

45. In an ignition system of an internal combustion engine of an automotive vehicle, a unit comprising: an element essential in said system for the operation of said engine: switch means connected in controlling relation with said element and settable in position restricting the functioning of said element to permit functioning of said element only under predetermined conditions; and means for preventing unauthorized removal of such restriction.

46. In an ignition system of an internal combustion engine of an automotive vehicle, a unit comprising: an element essential in said system for the operation of said engine; switch means connected in controlling relation with said element and settable in position restricting the functioning of said element to permit functioning of said element only while said vehicle is substantially at rest; and means for preventing unauthorized removal of such restriction.

47. In a power plant for an automotive vehicle, a unit comprising: an element essential for the operation of said power plant; control means settable in position restricting the functioning of said element to permit functioning of said element only under predetermined conditions; and means for preventing unauthorized removal of such restriction, comprising a theft-resisting casing enclosing said control means and at least the adjacent portion of said element.

48. In a power plant for an automotive vehicle, a unit comprising: an element essential for the operation of said power plant; control means settable in position restricting the functioning of said element to permit functioning of said element only while said vehicle is substantially at rest; and means for preventing unauthorized removal of such restriction, comprising a theft-resisting casing enclosing said control means and at least the adjacent portion of said element.

49. In an ignition system of an internal combustion engine of an automotive vehicle, a unit comprising: an element essential in said system for the operation of said engine: switch means connected in controlling relation with said element and settable in position restricting the functioning of said element to permit functioning of said element only under predetermined conditions; and means for preventing unauthorized removal of such restriction, comprising a theft-resisting casing enclosing said switch means and at least the adjacent portion of said element.

50. In an ignition system of an internal combustion engine of an automotive vehicle, a unit comprising: an element essential in said system for the operation of said engine; switch means connected in controlling relation with said element and settable in position restricting the functioning of said element to permit functioning of said element only while said vehicle is substantially at rest; and means for preventing unauthorized removal of such restriction, comprising a theft-resisting casing enclosing said switch means and at least the adjacent portion of said element.

In testimony whereof I hereunto affix my signature.

HOWARD J. MURRAY.